(12) United States Patent
Son et al.

(10) Patent No.: US 10,267,819 B2
(45) Date of Patent: Apr. 23, 2019

(54) METHOD AND APPARATUS TO MONITOR A RESOLVER

(71) Applicant: GM GLOBAL TECHNOLOGY OPERATIONS LLC, Detroit, MI (US)

(72) Inventors: Yo Chan Son, Rochester Hills, MI (US); Rachel L. Hoener, Orion, MI (US); Milan Ashok Vadera, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 15/015,732

(22) Filed: Feb. 4, 2016

(65) Prior Publication Data

US 2017/0227567 A1 Aug. 10, 2017

(51) Int. Cl.
*G01P 3/44* (2006.01)
*G01B 7/30* (2006.01)
(Continued)

(52) U.S. Cl.
CPC .............. *G01P 3/44* (2013.01); *G01B 7/30* (2013.01); *G01D 5/2073* (2013.01); *G01P 3/488* (2013.01);
(Continued)

(58) Field of Classification Search
CPC . G01B 7/30; G06F 3/061; G06F 13/28; G01P 3/44
(Continued)

(56) References Cited

U.S. PATENT DOCUMENTS 4,814,701 A * 3/1989 Wallrafen ................ G01P 3/44
324/160
6,084,376 A 7/2000 Piedl et al.
(Continued)

FOREIGN PATENT DOCUMENTS

CN 102818581 A 12/2012
CN 202855522 U 4/2013
(Continued)

OTHER PUBLICATIONS

Ja-Chun Han, Dian Tresna Nugraha, Shi-Nian, On-Chip Delta-Sigma ADC for Rotor Positioning Sensor Application (Resolver-to-Digital Converter), Published by SAE International on Apr. 1, 2014, 6 pages.
(Continued)

*Primary Examiner* — Dzung Tran
(74) *Attorney, Agent, or Firm* — Quinn IP Law (57) ABSTRACT

A device for monitoring a resolver disposed on a rotatable member is described herein, and includes a controller including a microprocessor circuit and an interface circuit connected to the resolver, wherein the microprocessor circuit includes a dual-core central processing unit (CPU), a pulse generator, a sigma-delta analog-to-digital converter (SDADC), a global memory device, an internal communication bus and a direct memory access device (DMA). The microprocessor circuit is disposed to control the pulse generator to generate an excitation pulse transferable to the excitation winding of the resolver, and control the SDADC to capture data from the secondary windings of the resolver and store the captured data in the memory buffer. A control routine is executed to detect an envelope for the captured data, and a rotor position for the resolver is determined based upon the detected envelope.

19 Claims, 4 Drawing Sheets

(51) Int. Cl.
*G06F 3/06* (2006.01)
*G06F 13/10* (2006.01)
*G06F 13/28* (2006.01)
*G06F 13/40* (2006.01)
*G01P 3/488* (2006.01)
*G01D 5/20* (2006.01)

(52) U.S. Cl.
CPC ............ *G06F 3/061* (2013.01); *G06F 3/0656* (2013.01); *G06F 3/0673* (2013.01); *G06F 13/102* (2013.01); *G06F 13/28* (2013.01); *G06F 13/4068* (2013.01)

(58) Field of Classification Search
USPC ........................................ 702/145, 183, 189
See application file for complete search history.

(56) References Cited

U.S. PATENT DOCUMENTS

| | | | | |
|---|---|---|---|---|
| 6,289,294 B1* | 9/2001 | Rataj | ................... | F02D 41/0097 250/231.13 |
| 7,692,322 B2* | 4/2010 | Wakasa | ................. | F03D 7/0224 290/44 |
| 2008/0262787 A1* | 10/2008 | Malakhova | ............. | F03D 7/047 702/145 |
| 2010/0007294 A1* | 1/2010 | Hasegawa | ............ | G01D 5/2451 318/400.04 |
| 2014/0117980 A1* | 5/2014 | Ely | ....................... | G01D 5/2046 324/207.17 |
| 2016/0190964 A1* | 6/2016 | Shin | ....................... | H02P 21/145 318/490 |

FOREIGN PATENT DOCUMENTS

| | | |
|---|---|---|
| CN | 104406515 A | 3/2015 |
| CN | 104796051 A | 7/2015 |
| CN | 105222814 A | 1/2016 |

OTHER PUBLICATIONS

Mingzhong Ya, "Design of Axis Angle Signal Acquisition System Based on PCI Bus", Full—text Database of Excellent Master's Degree Thesis in China, Jan. 15, 2008, p. 32-44.

* cited by examiner

METHOD AND APPARATUS TO MONITOR A RESOLVER

TECHNICAL FIELD

This disclosure is related to resolvers, and methods and systems for determining rotational positions associated therewith.

BACKGROUND

Devices that include rotatable members may employ resolvers to monitor angular position and rotational speed of the rotor. By way of non-limiting examples, powertrain systems may employ electrically-powered torque machines to generate tractive torque for propulsion. Known torque machines include multiphase electric motor/generators that electrically couple to energy storage devices via high-voltage electric buses and inverter modules. Torque machines may use resolvers to monitor rotational position and rotational speed, and use such information for control and operation thereof.

A resolver is an electromechanical transducer that includes a rotor having an excitation winding that is coupled to the rotatable member and a stator having secondary windings that are coupled to a non-rotating member of the device, wherein electromagnetic coupling between the primary winding and the secondary windings varies with the rotational position of the rotor. The primary winding may be excited with a sinusoidal signal, which induces differential output signals in the secondary windings. The magnitude of the electrical coupling onto the secondary windings relates to the rotational position of the rotor relative to that of the stator and an attenuation factor known as the resolver transformation ratio. In certain embodiments, the resolver is a variable reluctance resolver, in which an excitation winding is disposed in the stator, and an airgap between the rotor and the stator is modulated on the rotor, which modulates the transformation ratio depending on the rotational position. The output signals from the secondary windings may be phase-shifted by 90 degrees of rotation with respect to each other as a result of the secondary windings being mechanically displaced by 90/PP degrees of mechanical rotation, wherein PP is the quantity of pole pairs of the resolver. Thus, electrical rotation is determined based upon mechanical rotation divided a quantity of electrical pole pairs. The primary winding may be excited with a sine wave reference signal, which induces differential output signals on the secondary windings. The relationships between the resolver input and the differential output signals may be used to determine a sine and a cosine of the rotational angle of the rotor. Thus, the relationships between the resolver input signal and the resolver output signals may be analyzed to dynamically determine an angular position and rotational speed of the rotor, and thus the rotating member.

Known systems employing resolvers have resolver-to-digital conversion integrated circuit devices to process input signals from the resolver to generate rotational information that may be employed by a controller.

SUMMARY

A device for monitoring a resolver disposed on a rotatable member is described herein, and includes a controller including a microprocessor circuit and an interface circuit connected to the resolver, wherein the microprocessor circuit includes a dual-core central processing unit (CPU), a pulse generator, a sigma-delta analog-to-digital converter (SDADC), a global memory device, an internal communication bus and a direct memory access device (DMA). The pulse generator is electrically connected to an excitation winding of the resolver. The SDADC is electrically connected to secondary windings of the resolver, wherein the SDADC includes a memory buffer in communication with the communication bus. The dual-core CPU includes a first CPU and a second CPU. A clock synchronously controls clock speeds of the SDADC, the pulse generator, the first CPU and the second CPU. The microprocessor circuit is disposed to control the pulse generator to generate an excitation pulse transferable to the excitation winding of the resolver, and control the SDADC to capture data from the secondary windings of the resolver and store the captured data in the memory buffer. The DMA is controlled to transfer the captured data from the memory buffer to the global memory device via the communication bus. A control routine is executed to detect an envelope for the captured data, and a rotor position for the resolver is determined based upon the detected envelope.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
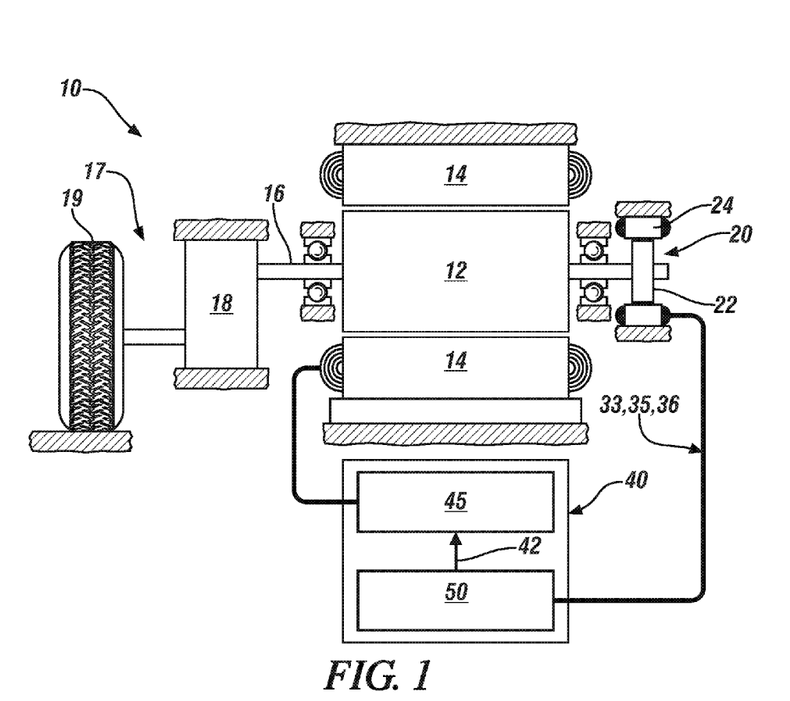
FIGS. 1 and 2 schematically illustrate an electric motor rotatably coupled to a load via a rotatable member that is monitored by a resolver and controlled by a motor controller, in accordance with the disclosure.
Figure 2:
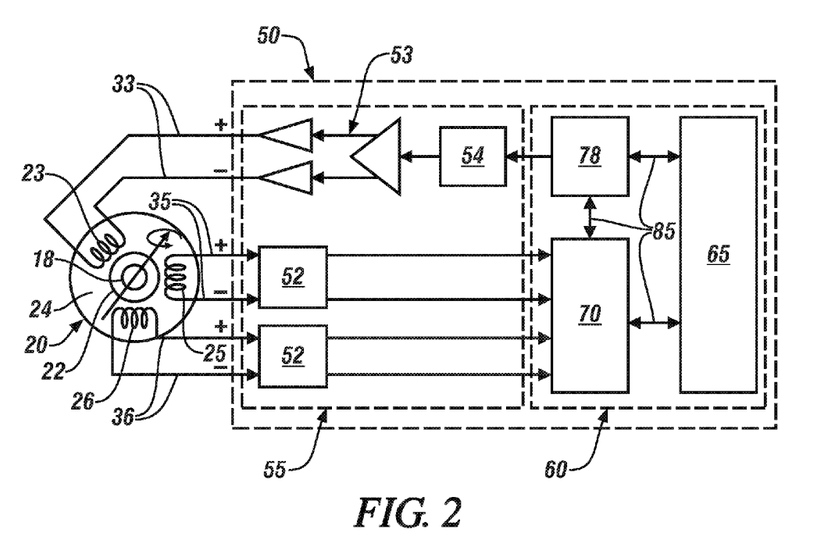

Referring now to the drawings, wherein the depictions are for the purpose of illustrating certain exemplary embodiments only and not for the purpose of limiting the same, FIGS. 1 and 2 schematically illustrate details of a motor control system for controlling operation of an electric motor 10 that rotatably couples to a load 17 via a rigid rotatable member 16, wherein rotational position of the rotatable member 16 is monitored by a resolver 20 and operation is controlled via a motor controller 40. As shown, the resolver 20 is disposed on a side of the electric motor 10 that is distal from the load 17, but the resolver 20 may be disposed in any suitable location for monitoring rotation of the rotatable member 16. The load 17 may be, by way of a non-limiting example, a gear box 18 coupled to a drive wheel 19 that interacts with a ground surface when employed as part of a powertrain system for a ground vehicle. The concepts described within may apply to any configuration that includes a rotatable member 16 of a device, wherein the rotatable member 16 is monitored by a resolver 20 to determine rotational position and speed thereof.

The electric motor 10 may be any suitable electric motor/generator device, e.g., a permanent magnet device, and includes a stator 14 and a rotor 12. As shown, the stator 14 is an annular device and the rotor 12 is coaxially disposed within and coupled to the rotatable member 16. Alternatively, the rotor 12 may be configured as an annular device with a coaxial stator 14 disposed within. Operation of the electric motor 10 is controlled via the motor controller 40 that preferably includes an inverter 45 in signal communication with a controller 50 via a communication link 42. The inverter 45 electrically connects to the stator 14 of the electric motor 10 to transfer electric power, either to generate torque on the rotor 12 that is transferred to the rotatable member 16, or to react torque on the rotor 12 that is transferred from the rotatable member 16. The controller 50 communicates with the resolver 20 to monitor rotational position of the rotatable member 16.

The resolver 20 includes a resolver rotor 22 that fixedly attaches to the rotatable member 16, and a resolver stator 24 that attaches to a grounding element, e.g., a motor case. The resolver rotor 22 may include a primary electrical winding referred to herein as an excitation winding 23, and the resolver stator 24 includes two secondary electrical windings referred to herein as first and second secondary windings 25, 26, respectively. Alternatively, the resolver 20 may be a variable reluctance resolver having the excitation winding 23 and the first and second secondary windings 25, 26 disposed on the resolver stator 24, wherein the resolver rotor 22 modulates an airgap therebetween to generate output signals on the first and second secondary windings 25, 26.

The excitation winding 23 and the first and second secondary windings 25, 26 operate as variable coupling transformers. In operation, the controller 50 communicates an excitation signal, preferably in the form of an analog sinusoidal reference signal, to the excitation winding 23 via first lines 33. In certain embodiments, the sinusoidal reference signal has a frequency in a range between 1 kHz and 15 kHz. The first and second secondary windings 25, 26 generate first and second output signals in response to the excitation signal, which are communicated via second and third lines 35, 36. When the first and second secondary windings 25, 26 are mechanically rotatably displaced by 90/PP degrees of mechanical rotation, wherein PP is the quantity of pole pairs of the resolver about the axis of rotation of the rotor 12, the first and second output signals generated by the first and second secondary windings 25, 26 are subjected to signal processing that includes digitization and demodulation to determine a rotational angle of the rotor 12 and hence the rotatable member 16. The resolver 20 may be configured with a single pole pair for the first and second secondary windings 25, 26, meaning that 360 degrees of mechanical rotation of the rotatable member 16 generates a signal indicating 360 degrees of electrical rotation from the resolver rotor 22. Alternatively, the resolver 20 may be configured with multiple pole pairs for the first and second secondary windings 25, 26. By way of example, when the resolver 20 is configured with two pole pairs, 180 degrees of mechanical rotation of the rotatable member 16 generates a signal indicating 360 degrees of electrical rotation from the resolver rotor 22, and when the resolver 20 is configured with three pole pairs, 120 degrees of mechanical rotation of the rotatable member 16 generates a signal indicating 360 degrees of electrical rotation from the resolver rotor 22.

The controller 50 includes a microprocessor circuit 60 and an interface circuit 55. The microprocessor circuit 60 preferably includes a dual-core central processing unit (CPU) 65, a pulse generator 78 and a sigma-delta analog-to-digital converter (SDADC) 70 that communicate via an internal parallel communication bus 85. The pulse generator 78 generates an electrical pulse that is transferred to the excitation winding 23 of the resolver 20 via signal conditioning circuitry including, e.g., a low-pass filter 54 and differential-output amplifier 53 that electrically connect via first lines 33 to the excitation winding 23 of the resolver 20. The first and second secondary windings 25, 26 of the resolver 20 communicate via second and third lines 35, 36, respectively, with input lines to the SDADC 70. The second and third lines 35, 36 include respective line filters 52 to remove electromagnetic interference (EMI) noise before being sent to the SDADC 70. The controller 50 communicates with the inverter 45 via the communications link 42.

The excitation winding 23 and the two secondary windings of the first and second secondary windings 25, 26 operate as variable coupling transformers. In operation, the controller 50 communicates an excitation signal, preferably in the form of an analog sinusoidal reference signal, to the excitation winding 23 via the first lines 33. In certain embodiments, the sinusoidal reference signal has a frequency in a range between 1 kHz and 15 kHz. The excitation signal may be generated by the pulse generator 78 in the form of a square wave reference signal, and passed through the low-pass filter 54 to form the sinusoidal waveform. The second and third lines 35, 36 communicate first and second output signals that are generated by the first and second secondary windings 25, 26 in response to the excitation signal. When the first and second secondary windings 25, 26 are mechanically rotatably displaced by 90/PP degrees of rotation about the axis of rotation of the rotor 12 (wherein PP is the quantity of pole pairs of the resolver), the first and second output signals generated by the first and second secondary windings 25, 26 may be subjected to signal processing that includes digitization and demodulation to determine a rotational angle of the rotor 12.

The motor controller 40 includes the microprocessor circuit 60 and other circuitries to sense the feedback signals such as motor current, input voltage, motor position and speed. The motor controller 40 generates the control signals for the power semiconductor switches of the inverter 45 to generate current that is transferred to the stator 14 via three-phase motor cables 15. The rotation of the rotatable member 16 coincides with the rotation of the rotor 12 and the resolver rotor 22, and the resolver rotor position and speed are directly coupled with the position and speed of the rotor 12. As an example of a permanent magnet motor drive system, the resolver rotor 22 is mounted to locate the north pole of the magnet in the rotor 12, permitting the motor controller 40 to control the electric motor 10 in relation to the motor magnet location to maximize the output torque for a given current. Specifically absent from any mechanization of the motor controller 40 described with reference to FIGS. 1 and 2 is a specialized integrated circuit in the form of a resolver-to-digital converter (RDC). Instead, an RDC system in the form of controller-executable routine(s) is described in detail herein.

Operation of an embodiment of the resolver 20 may be modeled as a rotary transformer, including an excitation signal EXC that may be sent to the excitation winding 23 and output signals SIN and COS from the secondary windings of the first and second secondary windings 25, 26. Example waveforms of the output signals SIN and COS are shown graphically with reference to FIG. 4, including SIN 402 and COS 404. By way of a non-limiting example, the excitation signal EXC may have an excitation frequency $f_e$ that is near 10 kHz, and is preferably greater than a rotational frequency f of the resolver rotor 22. A single rotational period (1/f) of the resolver rotor 22 is indicated by period 415, and one half of a single rotational period $(1/f_e)$ of the excitation frequency $f_e$ is indicated by period 405.

Figure 4:
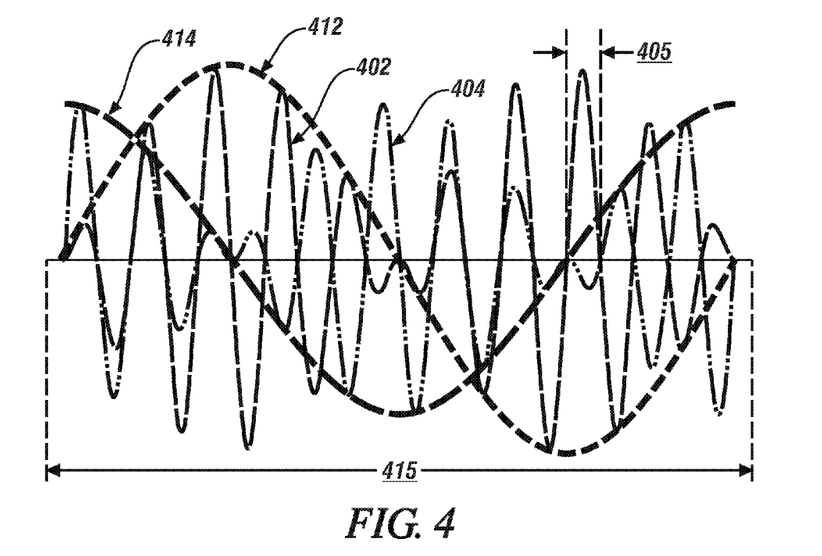
FIG. 4 graphically shows output signals from secondary windings of a resolver, including SIN and COS signals and corresponding envelope signals $SIN_{ENV}$ and $COS_{ENV}$ that may be extracted from the output signals SIN and COS, in accordance with the disclosure.

The output signals SIN 402 and COS 404 have position-dependent information (sin θ and cos θ) that includes a modulation signal sin $\omega_e$t, wherein $\omega_e$ is the excitation frequency. The excitation signal EXC may be represented as EQ. 1, and the output signals SIN and COS may be represented as EQ. 2 and EQ. 3, respectively, in a well-balanced system, as follows:

$$EXC = E \sin \omega_e t = EXC_+ - EXC_- \quad [1]$$

$$SIN = kE \sin \theta \sin(\omega_e t - \phi) = SIN_+ - SIN_- \quad [2]$$

$$COS = kE \cos \theta \sin(\omega_e t - \phi) = COS_+ - COS_- \quad [3]$$

wherein:
$\omega_e$ is the excitation frequency, in rad/s $(=2\pi f_e)$;
E is the excitation voltage;
k is a transformation ratio (gain) between the primary and the secondary windings;
θ is the resolver position in radians $(=\omega t = 2\pi f)$; and
φ is a phase delay introduced between the primary and secondary windings.

The terms $EXC_+$ and $EXC_-$ indicate the input signals from the first lines 33, the terms $SIN_+$ and $SIN_-$ indicate the output signals from the second lines 35, and the terms $COS_+$ and $COS_-$ indicate the output signals from the third lines 36. FIG. 4 further graphically shows a first envelope $SIN_{ENV}$ 412 associated with the SIN 402, and a second envelope $COS_{ENV}$ 414 associated with the COS 404. The first envelope $SIN_{ENV}$ 412 and the second envelope $COS_{ENV}$ 414 and associated parameters may be extracted from the output signals SIN 402 and COS 404 employing signal demodulation and other analyses that are described herein.

The sine and cosine signals of the rotational angle may be interpreted to determine a rotational angle of the resolver rotor 22, and hence a rotational angle of the rotatable member 16 and the rotor 12. The motor controller 40 may employ the rotational angle of the rotatable member 16 to control operation of the electric motor 10. It is appreciated that there may be a difference between the rotational angle as measured by the resolver 20 and the rotational angle of the rotor 12 in relation to the stator 14 of the electric motor 10 due to resolver offset or mechanical twisting of the rotatable member 16.

The first and second output signals generated by the first and second secondary windings 25, 26 in response to the excitation signal and communicated on the second and third lines 35, 36 are analog signals. The analog signals may be converted to a digital signal indicating angular position and rotational speed of the rotating member employing the motor controller 40.

Figure 3:
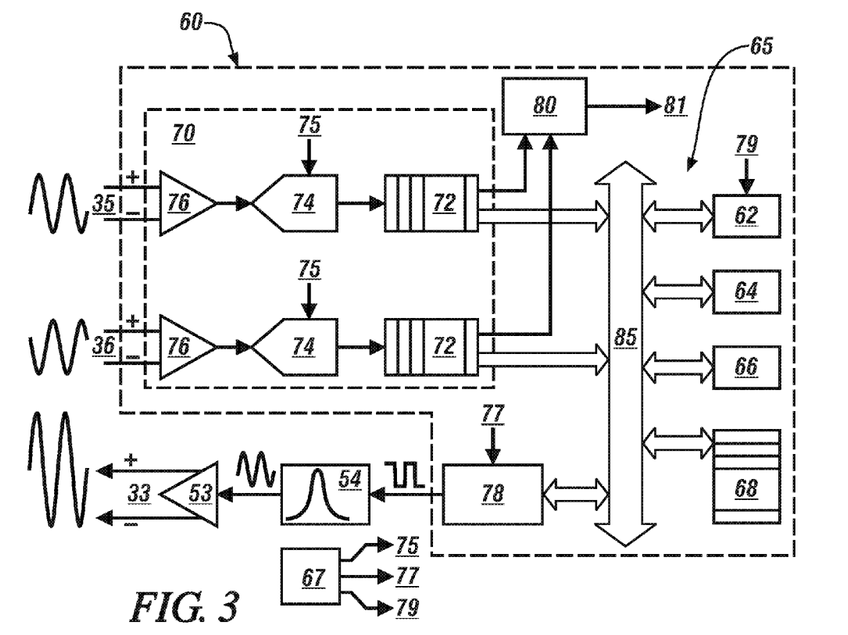
FIG. 3 schematically shows details of the motor controller described with reference to FIGS. 1 and 2, including a microprocessor circuit and an interface circuit, wherein the microprocessor circuit includes a dual-core CPU, a pulse generator and a sigma-delta analog-to-digital converter (SDADC), in accordance with the disclosure.

FIG. 3 schematically shows details of the microprocessor circuit 60 and an interface circuit 55 of the motor controller 40, including the dual-core CPU 65, the pulse generator 78, the SDADC 70 and a direct memory access (DMA) device 80. The dual-core CPU 65 is preferably configured as a dual-core central processing unit (CPU) including a first CPU core 64 and a second CPU core 66, a global timer 62, and a global random-access memory (RAM) device 68, all of which communicate via the communication bus 85. A clock 67 operates at a suitable speed, which preferably has an order of magnitude of 10 MHz in certain embodiments. The SDADC 70 is a dual-channel analog-to-digital converter device that employs an oversampling modulator, successive approximation and a digital decimation filter to generate high-resolution digital signals from lower frequency analog input signals. The dual channel SDADC 70 includes two SDADC devices, each of which is preferably arranged to communicate with one of the second and third lines 35, 36 that communicate the first and second output signals generated by the first and second secondary windings 25, 26 in response to the excitation signal. Each of the SDADC devices 70 includes a differential amplifier 76 that communicates with an ADC 74 that generates a digital signal that is stored in a first-in first-out (FIFO) memory buffer 72. The clock 67 drives a sigma-delta (SD) clock 75 in synchronization with a CPU clock 79 and a pulse generator (PG) clock 77. The SD clock 75 controls sequencing of the analog-to-digital converter (ADC) 74. The FIFO memory buffer 72 communicates with the bus 85. The DMA 80 generates an interrupt signal 81 in response to register signals that are communicated from the FIFO memory buffer 72. The microprocessor circuit 60 employs signal processing hardware and software routines to generate envelope information, e.g., the first envelope $SIN_{ENV}$ 412 and the second envelope $COS_{ENV}$ 414, which may be employed to determine the rotor position θ of the resolver and hence the rotating member 16. The first envelope $SIN_{ENV}$ 412 and the second envelope $COS_{ENV}$ 414, which are described with reference to FIG. 4, may be extracted from the output signals SIN 402 and COS 404 employing analytical processes described herein.

The dual-core CPU 65 facilitates processing of data from the resolver 20 simultaneously and in parallel with executing control of the electric motor 10. The second CPU core 66 of the dual-core CPU 65 is configured to process the data delivered from the SDADC 70 and determine signal envelope information, and the first CPU core 64 is configured to execute motor control based upon the signal envelope information that is delivered from the second CPU core 66. The SDADC 70 and the pulse generator 78 are synchronized in the operation, and they share the SD clock 75 with the global timer 62. As such, the SD clock 75, the PG clock 77, and the CPU clock 79 have a common clock 67 and are synchronized with each other. The pulse generator 78 generates a square-wave pulse or modulated pulse train, which is filtered through the low-pass filter or band-pass filter 54 that is amplified by the differential-output amplifier 53 to form an analog sinusoidal reference signal. The analog sinusoidal reference signal is communicated to the excitation winding 23 via first lines 33 and serves as an excitation signal that drives the primary winding of the resolver 20. The received signals from the resolver secondary windings, SIN 402 and COS 404 are sampled by the SDADC 70. In the embodiment shown, the SIN+/SIN− signals communicated via lines 35 and the COS+/COS− signals communicated via lines 36 pass through one of the differential amplifiers 76 and is sampled by the ADC 74. The SDADC 70 may run continuously, or, alternatively, may be programmed to convert a fixed quantity of samples. Each signal is preferably converted at an integer multiple of N times the excitation frequency $f_e$, wherein N is preferably greater than three to avoid aliasing. For example, if the excitation frequency is 10 kHz, N can be selected to be 10. The SDADC 70 can be configured to run at N×10 kHz=100 kHz continuously, the SDADC 70 can be configured to sample N=10 samples of data at every 10 μs (=1/100 kHz) at the rising (or falling) edge of the output of the pulse generator 78, and restart the actions at next rising (or falling) edge of the output of the pulse generator 78. The DMA 80 commands operation to pull data from each of the FIFO memory buffer 72 when the quantity of expected samples in a cycle is met, and moves the data for storage in the global memory device 68.

Figure 5:
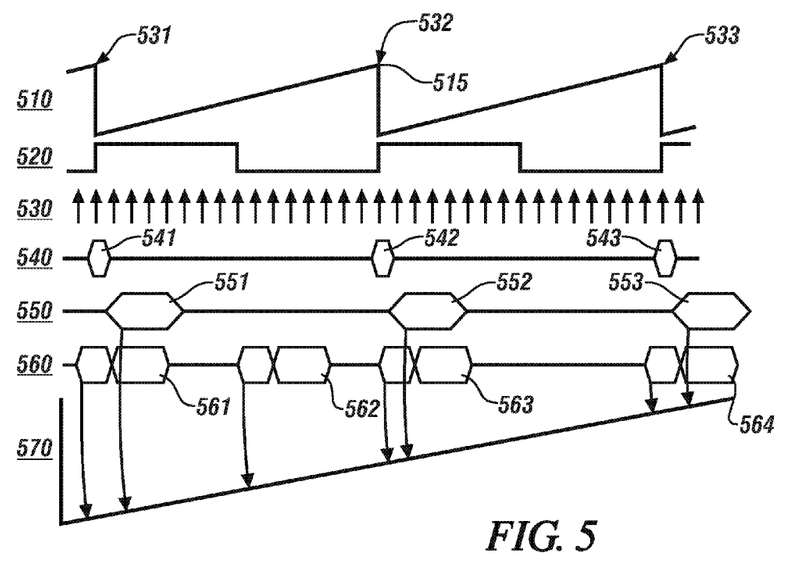
FIG. 5 graphically shows data associated with operation of elements of the dual-core CPU of the motor controller that includes independently executed processing of data from the resolver and control of the electric motor, in accordance with the disclosure.

FIG. 5 graphically shows data associated with operation of the elements of the dual-core CPU 65 to achieve independent parallel processing of data from the resolver 20 and control of the electric motor 10. Graphed parameters include a counter 510 that is output from the pulse generator 78, a pulse generator output 520 in the form of a square-wave duty cycle that is output from the pulse generator 78, ADC sampling 530 that is output from the SDADC 70, data transfer events 540 output from the DMA 80, envelope detection event 550 output from the second CPU 66, and execution of the motor control software 560 from the first CPU 64, all in relation to a common time base 570 that is output from the global timer 62.

The pulse generator 78 resets the value of the counter 510 when the count equals the excitation period $t_e$ 515 which is an inverse of the excitation frequency $f_e$, or $1/f_e$. When the counter 510 is reset to zero, the pulse generator output 520 is set to have a 50% duty cycle. In this example, N=16 is used. The SDADC 70 initiates ADC sampling 530 with the rising edge of the pulse generator output 520, and collects data at a rate of every $1/16 f_e$. When the collected number of data in each channel (SIN 402 and COS 404) becomes N, as indicated at 531, 532, and 533, the DMA 80 initiates data transfer from the FIFO memory buffer 72 to the global memory device 68 without loading either the first CPU 64 or the second CPU 66. Example DMA data transfer events are indicated at 541, 542, 543. When all the data transfer are complete, the DMA 80 calls the interrupt service routine at the second CPU 66 to process the envelope information for analog signals. At the beginning of each envelope detection event 550 at the second CPU 66, the excitation period $t_e$ of the pulse generator and time stamp $t_1$ from the pulse generator output 520 and the time base 570 that is output from the global timer 62 are synchronized. Timers in the microprocessor count in binary integers, and the global timer 62 can be configured to count for an extended period of time and roll over. If the second CPU 66 is fast enough to react the DMA interrupt request, time stamp $t_e$ is close to the beginning number, i.e., equal to 0 in normal operation. By monitoring the time stamp $t_e$, the synchronization between the SDADC 70 and the pulse generator 78 can be monitored. Time stamp $t_1$ is used to record the starting time of the batch data processing. Example envelope detection events 551, 552, and 553 are indicated, and follow corresponding DMA data transfer events 541, 542 and 543, respectively.

Asynchronously with the second CPU 66 envelope detection, the first CPU 64 runs a separate interrupt service routine to execute motor control software 560 to generate PWM motor control outputs to control the electric motor 10, as indicated by elements 561, 562, 563 and 564. This includes capturing and analyzing pertinent data related to motor control, including motor position/speed, current and input voltage and calculating output voltage generation is then calculated based thereon. At the beginning of each interrupt, the first CPU 64 captures the time stamp $t_0$ of the global timer 62 when it prepares discrete and analog inputs for PWM control of the motor. The time difference between $t_0$ and $t_1$ is used to extrapolate position information θ[k] at the beginning of the motor control interrupt routine executed by the first CPU 64, in accordance with EQ. 4, which assumes the speed ω does not change for a short period of time such as during the PWM period. This provides a way to accurately measure rotor position synchronously with controlling the electric motor 10.

$$\theta[k]=\theta_{raw}[n]+\omega[k-1]\times(t_0[k]-t_1[n]-t_{offset}),\qquad[4]$$

wherein $t_0[k]-t_1[n]>0$; and
wherein:
- $\theta_{raw}[n]$ is a raw rotor position that is directly determined from the envelope information of n-th step at the second CPU 66;
- ω[k] is a speed determined from the position of the k-th step at the first CPU 64; and
- $t_{offset}$ is a calibration for offset adjustment in time.

Figure 6:
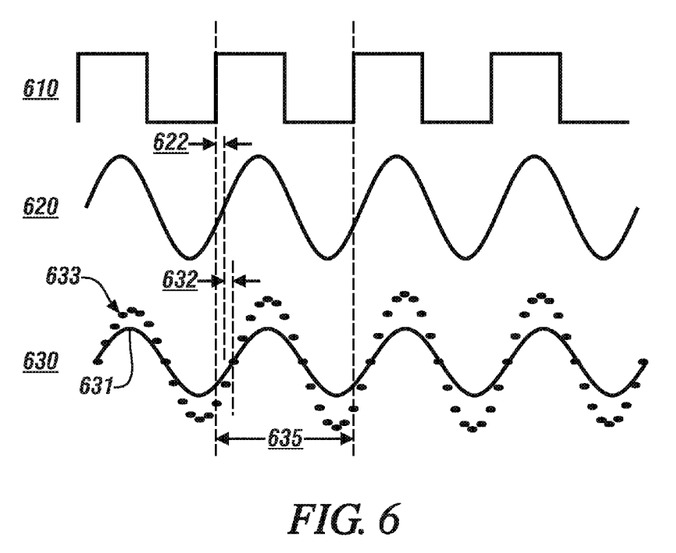
FIG. 6 graphically shows data associated with operation of an embodiment of the resolver, including a waveform from a pulse generator, a resolver excitation signal, and primary and secondary signals output from an embodiment of the resolver, in accordance with the disclosure.

FIG. 6 graphically shows examples of signal waveforms including a pulse generator, a resolver excitation signal, and the primary and secondary signals output from an embodiment of the resolver 20. In this example, the pulse generator 78 generates a square-wave 610 having a period indicated by element 635. Alternatively, the pulse generator 78 may generate a pulse-width-modulated signal. The fundamental frequency, i.e., excitation frequency $f_e$, of this signal is assumed to be an excitation signal reference as employed in EQ. 1. The square-wave signal 610 passes through the low-pass filter or band-pass filter 54 to create a smooth EXC signal 620 to eliminate any harmonic signal. The filtering may introduce a phase shift $\phi_1$ 622 from the original pulse generator output 610 as shown. The EXC signal 620 is communicated to the resolver primary winding 630, appearing as EXC signal 631 conceptually when handled in the software in the ideal condition to create the maximum amplitude of the envelope, and the signals from the secondary windings, e.g., SIN and COS 633, exhibit an amplitude change by the transformation ratio k and an additional phase shift $\phi_2$ 632 due to operation of the resolver 20 and the line filter 52. The sum of these two phase shift forms a total phase shift between the reference excitation signal and SIN/COS signals at the input of the microcontroller, as follows:

$$\phi=\phi_1+\phi_2$$

A first envelope $SIN_{ENV}$ associated with the SIN signal from the secondary windings and a second envelope $COS_{ENV}$ associated with the COS signal from the secondary windings may be extracted using Fourier series calculation once all the data in an excitation cycle are collected, assuming that the envelope is slowly changing or almost constant during an excitation period. Examples of a first envelope $SIN_{ENV}$ 412 associated with the SIN 402, and a second envelope $COS_{ENV}$ 414 associated with the COS 404 are shown with reference to FIG. 4.

The $SIN_{ENV}$ and $COS_{ENV}$ can be calculated employing EQS. 5 and 6, respectively, using the known reference signal (including a software-introduced phase shift $\phi_{sw}$), wherein $$i = \frac{2\pi i}{N\omega_e}$$

w within the excitation period.

$$SIN_{ENV} = \frac{2}{N}\sum_{i=0}^{N-1} SIN[i]\sin\left(\frac{2\pi i}{N} - \phi_{sw}\right) = kE\cos(\phi - \phi_{sw})\sin\theta \quad [5]$$

$$COS_{ENV} = \frac{2}{N}\sum_{i=0}^{N-1} COS[i]\sin\left(\frac{2\pi i}{N} - \phi_{sw}\right) = kE\cos(\phi - \phi_{sw})\cos\theta \quad [6]$$

This analysis assumes cos φ is constant when the phase shift (4) is constant during the calculation of EQS. 5 and 6. Without the phase shift φ, each of the envelopes has a maximum amplitude kE. The mismatch of the phase shift between the hardware and the software introduces cos(φ−$\phi_{sw}$) that results in an amplitude reduction. In order to avoid this, EQS. 7 and 8 are executed as part of envelope detection, as follows:

$$SIN_{QUAD} = \frac{2}{N}\sum_{i=0}^{N-1} SIN[i]\cos\left(\frac{2\pi i}{N} - \phi_{sw}\right) = kE\sin(\phi - \phi_{sw})\sin\theta \quad [7]$$

$$COS_{QUAD} = \frac{2}{N}\sum_{i=0}^{N-1} COS[i]\cos\left(\frac{2\pi i}{N} - \phi_{sw}\right) = kE\sin(\phi - \phi_{sw})\cos\theta \quad [8]$$

The terms $SIN_{QUAD}$ and $COS_{QUAD}$ will have non-zero values when a phase mismatch occurs, and they may be employed to detect an actual hardware phase shift φ by adjusting $\phi_{sw}$, to maximize the values for $SIN_{ENV}$ and $COS_{ENV}$ that are calculated employing EQS. 5 and 6, respectively. The calculated values for the first envelope $SIN_{ENV}$ and the second envelope $COS_{ENV}$ may be employed to determine the rotor position θ, and the calculated values for the third envelope $SIN_{QUAD}$ and the fourth envelope $COS_{QUAD}$ along with $SIN_{ENV}$ and $COS_{ENV}$ may be employed to determine hardware phase shift φ.

Figure 7:
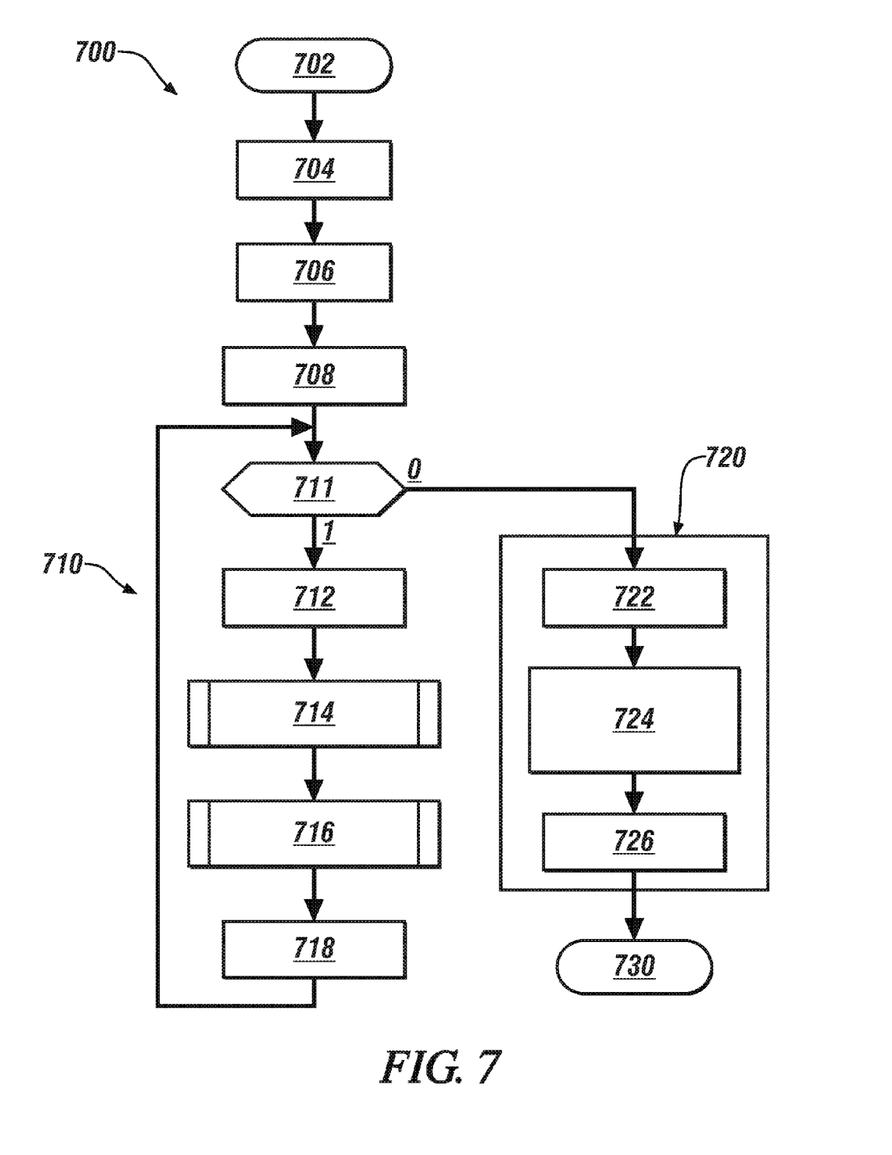
FIG. 7 schematically shows details of a software flowchart for controlling an embodiment of the resolver, including an interrupt routine for generating envelope information from the signal outputs of the secondary windings, in accordance with the disclosure.

FIG. 7 schematically shows details of a software flowchart for an interrupt routine 700 that may be executed by an embodiment of the motor controller 40 to determine $SIN_{ENV}$, $COS_{ENV}$, $SIN_{QUAD}$, $COS_{QUAD}$ and sampling time $t_1$ of the envelope processing described herein. The interrupt routine 700 is preferably executed by the second CPU 66 to evaluate data and determine the first envelope $SIN_{ENV}$ associated with the SIN signal from the secondary windings and the second envelope $COS_{ENV}$ associated with the COS signal from the first and second secondary windings 25, 26 of the resolver 20, as described with reference to FIGS. 4 and 6. This interrupt routine 700 may be executed in the second CPU 66 immediately after completion of each DMA data transfer event. Example DMA data transfer events 541, 542, and 543, and example envelope detection events 551, 552, and 553 are depicted in FIG. 5. At the beginning of each execution of the interrupt routine 700, a time stamp $t_1$[n] is captured from the global timer 62. Next, the software phase delay $\phi_{sw}$ that is identified outside of this routine, from the first CPU, is copied locally so that a constant number is used to generate the internal signals $$SIN\left(\frac{2\pi i}{N} - \phi_{sw}\right) \text{ and } COS\left(\frac{2\pi i}{N} - \phi_{sw}\right)$$

in the following loop. Then, EQS. 5-8 are executed to calculate values for the first envelope $SIN_{ENV}$, the second envelope $COS_{ENV}$, the third envelope $SIN_{QUAD}$ and the fourth envelope $COS_{QUAD}$. Table 1 is provided as a key wherein the numerically labeled blocks and the corresponding functions are set forth as follows, corresponding to the interrupt routine 700.

TABLE 1

| BLOCK | BLOCK CONTENTS |
|---|---|
| 702 | Start Interrupt routine |
| 704 | Capture time stamp |
| 706 | Capture phase delay |
| 708 | Initialize data buffer |
| 710 | Execute envelope detection |
| 711 | Is the calculation complete? (Have been through all the indexes?) |
| 712 | Increment index |
| 714 | Extract $SIN_{ENV}$, $COS_{ENV}$ and store in data buffer (EQS. 5 and 6) |
| 716 | Extract $SIN_{QUAD}$, $COS_{QUAD}$ and store in data buffer (EQS. 7 and 8) |
| 718 | Prepare for the next index calculation for EQS. 5 through 8 |
| 720 | Execute Storage for Global Memory |
| 722 | Lock Semaphore |
| 724 | Scale and transfer to global memory $SIN_{ENV}$, $COS_{ENV}$, $SIN_{QUAD}$ and $COS_{QUAD}$ from data buffer with data rescale (completion of EQS. 5 through 8), and copy time stamp |
| 726 | Unlock Semaphore |
| 730 | End interrupt routine |

The interrupt routine 700 executes in the second CPU 66 after a DMA data transfer event is completed (702) and includes capturing a time stamp (704) and a phase delay (706) at the completion of the data transfer event. The data buffer is initialized, e.g., as a 32-bit buffer (708), and an envelope calculation loop 710 is executed. The envelope detection loop (710) includes incrementing the index i (712). The first in-phase envelope $SIN_{ENV}$ associated with the SIN data, and the second in-phase envelope $COS_{ENV}$ associated with the COS date are extracted from the stored data, employing EQS. 5 and 6, respectively (714). Similarly, the first quadrature envelope $SIN_{QUAD}$ associated with the SIN data, and the second quadrature envelope $COS_{QUAD}$ associated with the COS data are extracted, employing EQS. 7 and 8, respectively (716). The phase index for the excitation signal is incremented (718), and execution of the envelope detection loop (710) reiterates until the calculations of EQS. 5 through 8 are complete, as indicated by the index i (711)(1). When the buffer is filled (711)(1), a storage routine is executed (720). The results need to be stored in the global memory 68 so that the first CPU 64 which is responsible for executing motor control can read without the data being corrupted by the second CPU 66 and use the result for the position/speed detection and diagnostics. In the multi-core CPU environment, the result cannot be written directly to the global memory 68 since the first CPU 64 can fetch the result while the second CPU 66 stores them, which may create a data coherency problem. In order to avoid such a situation, a semaphore is locked (722) to prevent the second CPU 66 from writing to or otherwise accessing the shared global memory 68 during data transfer. The data, in the form of the time stamp and the $SIN_{ENV}$, $COS_{ENV}$, $SIN_{QUAD}$, $COS_{QUAD}$ values in the data buffer are transferred to the shared global memory 68 (724), and the semaphore is unlocked to permit the second CPU 66 to have access to the shared global memory 68 (726). This iteration of the interrupt routine 700 ends after the data transfer (730). The motor control routine reads motor current, the inverter input voltage and position/speed information from the sensor, and determines the output voltage of the power inverter in order to control the motor current, torque and speed based thereon.

The motor control routine executed in the first CPU 64 can run at a fixed or variable switching frequency between 2 kHz and 20 kHz, for example. At the beginning of the motor control routine in the first CPU 64, the motor information for the motor control needs to be captured in order to provide the best performance. First, the time stamp of the global timer is captured in order to capture $t_0[k]$ in EQ. 4. Then, the routine needs to read data from the global memory using the semaphore. The motor control routine reads motor current, the inverter input voltage and position/speed information from the sensor, and determines the output voltage of the power inverter in order to control the motor current, torque and speed Thus, a set of signals, $SIN_{ENV}$, $COS_{ENV}$, $SIN_{QUAD}$, $COS_{QUAD}$ and time stamps $t_0$ and $t_1$ may be generated to determine motor speed and position without time delays that may be introduced in the first CPU 64. The concepts described herein provide a systematic way to process the raw signals to calculate rotor position, rotor speed and a phase shift φ. In certain embodiments, the rotor position θ may be determined from the states for $SIN_{ENV}$ and $COS_{ENV}$ as follows, and there can be numerous other ways of executing and filtering the calculation based on all the information captured in the second CPU.

$$\theta_{raw} = \tan^{-1}(COS_{ENV}, SIN_{ENV}) \quad [9]$$

As one non-limiting example of motor control using a PWM inverter, the controller 50 captures the motor position, motor speed, motor current and inverter input voltage. These inputs are used to determine the motor output voltage at the next PWM cycle using a PI controller. Preferably, all of these signals need to be captured at the same timing, in order to avoid the performance degradation due to the signal delay between the input and the output. In case of the analog signals such as the motor current and inverter input voltage, they can be synchronized with the output PWM period or the cycle time for execution of the motor control software 560.

The raw motor position (that can be calculated either in CPU0 or CPU1) $\theta_{raw}$ can be used as in EQ. 4 to calculate the precise position for motor control. In this way, the proper motor position $\theta[k]$ that is synchronized with the execution of the motor control software 560 may be obtained just like the motor current and inverter voltage as described. The motor speed ω can determined from the increment of θ with proper processing.

Thus, the operation described herein related to converting resolver data to digitally-readable data for use in position, speed and fault detection may be executed employing software executed by a multi-core processor relying upon information from conventional peripheral devices, and without relying upon a specialized RDC (resolver-to-digital converter) integrated circuit device. A synchronized pulse generator replaces the oscillator (OSC), and the processor directly reads the analog signals after the line filter. The CPU core controls the pulse generator and A/D converter timing. CPU core calculates EXC signal (1), and send it out through the pulse generator, which eventually becomes $EXC_+$ and $EXC_-$. The A/D converter samples $SIN_+$, $SIN_-$, $COS_+$ and $COS_-$ signals that are synchronized with the excitation signal EXC.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include analog, digitized analog, and discrete signals representing inputs from sensors, actuator commands, and communication between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A device to control an electric motor using an output voltage of a power inverter operatively connected to an electric motor, wherein the output voltage is determined based upon a rotational position of a resolver disposed on a rotatable member of the electric motor, comprising:
  a controller including a microprocessor circuit and an interface circuit connected to the resolver, wherein the microprocessor circuit includes a dual-core central processing unit (CPU), a pulse generator, a sigma-delta analog-to-digital converter (SDADC), a global memory device, an internal communication bus and a direct memory access device (DMA);
  wherein the pulse generator is electrically connected to an excitation winding of the resolver;
  wherein the SDADC is electrically connected to secondary windings of the resolver;
  wherein the SDADC includes a memory buffer in communication with the communication bus;
  wherein the dual-core CPU includes a first CPU and a second CPU; and
  a clock synchronously controlling clock speeds of the SDADC, the pulse generator, the first CPU and the second CPU;
    wherein the microprocessor includes an instruction set executable to:
      control the pulse generator to generate an excitation pulse transferable to the excitation winding of the resolver,
      control the SDADC to capture data from the secondary windings of the resolver and store the captured data in the memory buffer,
      control the DMA to transfer the captured data from the memory buffer to the global memory device via the communication bus,
      detect an envelope for the captured data that is stored in the global memory device,
      determine, via the second CPU, a rotor position for the resolver based upon the detected envelope, and
      execute, via the first CPU, a motor control routine based upon the rotor position for the resolver, wherein the motor control routine includes determining a motor current, an inverter input voltage and the rotor position for the resolver, and determining an output voltage of the power inverter to control the electric motor based thereon.

2. The device of claim 1, wherein the second CPU executes the control routine to detect the envelope for the captured data.

3. The device of claim 1, wherein the first CPU determines the rotor position for the resolver based upon the detected envelope.

4. The device of claim 1, wherein the pulse generator is electrically connected to the excitation winding of the resolver via a low-pass filter and a differential amplifier.

5. The device of claim 1, wherein the SDADC is electrically connected to secondary windings of the resolver via line filters disposed to remove electro-magnetic interference noise.

6. The device of claim 1, wherein the resolver is a variable reluctance resolver.

7. The device of claim 1, wherein the memory buffer is a first-in first-out memory buffer.

8. A motor controller for an electric motor, comprising:
  a controller in communication with an inverter and a resolver, wherein the resolver is disposed on a rotatable member of the electric motor and the inverter is electrically connected to the electric motor;
  the controller including a microprocessor circuit and an interface circuit, wherein the microprocessor circuit includes a dual-core central processing unit (CPU), a pulse generator, a sigma-delta analog-to-digital converter (SDADC), a global memory device, an internal communication bus and a direct memory access device (DMA);
  wherein the pulse generator is electrically connected to an excitation winding of the resolver;
  wherein the SDADC is electrically connected to secondary windings of the resolver;
  wherein the dual-core CPU includes a first CPU and a second CPU; and
  wherein the second CPU processes data from the SDADC simultaneously and in parallel with the first CPU executing control of the inverter electrically connected to the electric motor;
  wherein the second CPU is disposed to determine a rotor position for the resolver; and
  wherein the first CPU is disposed to execute PWM control of the inverter to control the electric motor based upon the rotor position for the resolver.

9. The motor controller of claim 8, wherein the SDADC delivers data from the secondary windings of the resolver, wherein the second CPU processes the data from the SDADC to determine signal envelope information, and wherein the first CPU executes motor control based upon the signal envelope information from the second CPU.

10. The motor controller of claim 8, further comprising:
  the SDADC including a memory buffer in communication with the communication bus; and
  wherein the microprocessor circuit is disposed to:
    control the pulse generator to generate an excitation pulse transferable to the excitation winding of the resolver,
    control the SDADC to capture data from the secondary windings of the resolver and store the captured data in the memory buffer,
    control the DMA to transfer the captured data from the memory buffer to the global memory device via the communication bus,
    execute a control routine in the second CPU to process the data from the SDADC to detect an envelope,
    execute a control routine in the second CPU to determine the rotor position for the resolver based upon the detected envelope, and
    execute a control routine in the first CPU to control the inverter to control the electric motor based upon the rotor position for the resolver.

11. The motor controller of claim 8, further comprising a pulse generator clock disposed to control the pulse generator, a CPU clock disposed to control sequencing of the first and second CPUs and a sigma-delta clock disposed to control sequencing of the SDADC, wherein a common clock synchronously controls clock speeds of the pulse generator clock, the CPU clock and the sigma-delta clock.

12. The motor controller of claim 8, wherein the memory buffer is a first-in first-out memory buffer.

13. The motor controller of claim 8, wherein the second CPU processes data from the SDADC simultaneously and in parallel with the first CPU executing control of the inverter electrically connected to the electric motor.

14. The motor controller of claim 8, wherein the controller does not include a resolver-to-digital converter (RDC) integrated circuit.

15. A method for controlling an electric motor, wherein the electric motor includes a resolver disposed on a rotor of the electric motor and an inverter is electrically connected to the electric motor, the method comprising:

controlling a pulse generator to generate an excitation pulse transferable to an excitation winding of the resolver;

controlling a sigma-delta analog-to-digital converter (SDADC) to capture data from secondary windings of the resolver and store the captured data in a memory buffer;

controlling a direct memory access device (DMA) to transfer the captured data from the memory buffer to a global memory device;

detecting a data envelope based upon the captured data;

determining, via a second controller of a dual-core central processing unit (CPU), a rotor position for the resolver based upon the detected envelope; and controlling, via a first controller of the dual-core CPU, the electric machine based upon the rotor position for the resolver.

16. The method of claim 15, further comprising executing control of the inverter to control the electric motor based upon the rotor position for the resolver.

17. The method of claim 16, comprising detecting the data envelope based upon the captured data and determining the rotor position for the resolver based upon the detected envelope simultaneously and in parallel with executing control of the inverter to control the electric motor based upon the rotor position for the resolver.

18. The method of claim 15, further comprising controlling a pulse generator clock disposed to control the pulse generator at a clock rate that is synchronous with a sigma-delta clock disposed to control sequencing of the SDADC.

19. The device of claim 1, wherein the device does not include a resolver-to-digital converter (RDC) integrated circuit.

* * * * *